United States Patent [19]

Chen et al.

[11] Patent Number: 5,450,482
[45] Date of Patent: Sep. 12, 1995

[54] DYNAMIC NETWORK AUTOMATIC CALL DISTRIBUTION

[75] Inventors: Hsing-Tsuen Chen, Naperville; Donald M. Parrish, Jr., Downers Grove; Paul R. Sand, Bolingbrook, all of Ill.

[73] Assignee: AT&T Corp., Murray Hill, N.J.

[21] Appl. No.: 998,318

[22] Filed: Dec. 29, 1992

[51] Int. Cl.⁶ .......................... H04M 7/00; H04M 3/00
[52] U.S. Cl. ........................... 379/207; 379/265; 379/220; 379/221; 379/230
[58] Field of Search .............. 379/221, 266, 220, 265, 379/113, 219, 309, 225, 265, 207, 230, 229, 112

[56] References Cited

U.S. PATENT DOCUMENTS

| | | | |
|---|---|---|---|
| 3,411,140 | 11/1968 | Halina et al. | 379/221 X |
| 4,284,852 | 8/1981 | Szybicki et al. | 379/221 |
| 4,400,587 | 8/1983 | Taylor et al. | 379/221 |
| 4,620,066 | 10/1986 | Bushnell et al. | 379/266 |
| 4,656,658 | 4/1987 | King | 379/221 |
| 4,953,204 | 8/1990 | Cuschleg, Jr. | 379/266 |
| 5,036,535 | 7/1991 | Gechter et al. | 379/221 |
| 5,073,890 | 12/1991 | Danielson | 379/309 |
| 5,142,570 | 8/1992 | Chaudhary et al. | 379/221 |
| 5,249,223 | 9/1993 | Vanacore | 379/113 |

FOREIGN PATENT DOCUMENTS

| | | | |
|---|---|---|---|
| 658156 | 10/1986 | Switzerland | 379/221 |
| 90308557.9 | 6/1989 | United Kingdom | H04Q 3/00 |

OTHER PUBLICATIONS

"Traffic Engineering for Automatic Call Distribution Networks", Tenth International Teletraffic Congress, Proceedings 2, Montreal 1983, pp. 1-8.
"A Switch in Time", Phil Tremewan, *Telecom World*, Aug., 1992, pp. 55 & 59.

*Primary Examiner*—James L. Dwyer
*Assistant Examiner*—Daniel S. Hunter
*Attorney, Agent, or Firm*—Michael B. Johannesen

[57] ABSTRACT

A network ACD that, when one switch in the network has blocked services, distributes calls to another switch with available services; wherein such distribution is based on information stored in each switch. The stored information comprises a list of switches within the network wherein an availability status is associated with each service, and an availability status of a trunk connecting the initial switch and the other switches in the network. Each switch sends an updated status to the other switches via a signaling network whenever a service changes status.

3 Claims, 3 Drawing Sheets

ROUTE CALL

DYNAMIC NETWORK AUTOMATIC CALL DISTRIBUTION

TECHNICAL FIELD

This invention relates to the field of automatic call distribution systems (ACD), and more specifically to a non-blocking ACD network that efficiently handles call overflow.

BACKGROUND OF THE INVENTION

Automatic Call Distribution systems (ACD) are widely used to answer calls quickly while using as few telephone network resources as possible. When an ACD receives a call, the goal is to distribute the call to the first available operator or service circuit that can handle the call. These systems work well until call handling resources are at or near capacity. Several systems have been proposed and/or implemented that reroute calls to other ACD systems or other resources within the same ACD system at such times. These systems generally rely on a priority list so that, when services are blocked at one ACD, the list is consulted and the call is sent to another ACD system on the list. There are various algorithms (such as time of day, day of week, etc.) used for determining which entry in the list is used. These schemes do not take into account the specific situation when network resources are not available to deliver the call to the alternate destination and resources are not available at the alternate destination. This results in more blocked calls and higher network occupancy. Therefore, a problem in the art is that no ACD system can route a call from a switch with blocked resources to another switch with a reasonable degree of certainty that the destination switch and path thereto is not blocked.

SUMMARY OF THE INVENTION

This invention provides a network ACD that, when one switch in the network has blocked resources, uses information stored in that switch to insure that the calls it distributes are routed to another switch which has available resources. When a call for a prespecified service is received at a switch, the switch first checks to determine whether it can handle the call. If the switch cannot handle the call, then the switch checks stored status tables to determine which other switches in the network can handle the call. The call is then delivered to the determined switch. The stored status tables comprise a list of switches within the network wherein an availability status is associated with each service (such a directory assistance, toll assistance, credit card, etc.), and an availability status of a trunk connecting the switch and the other switches in the network. The two statuses are "ANDed" together to derive the availability status. Advantageously, each switch sends an updated status to the other switches via a signaling network whenever a service changes status (e.g., no available operators). Such status messages are controlled so that status change messages do not flood the system causing "thrashing" of the availability status tables in each switch.

DESCRIPTION OF THE DRAWING

A more complete understanding of the invention may be obtained from consideration of the following description in conjunction with the drawings in which.

DETAILED DESCRIPTION

Figure 1:
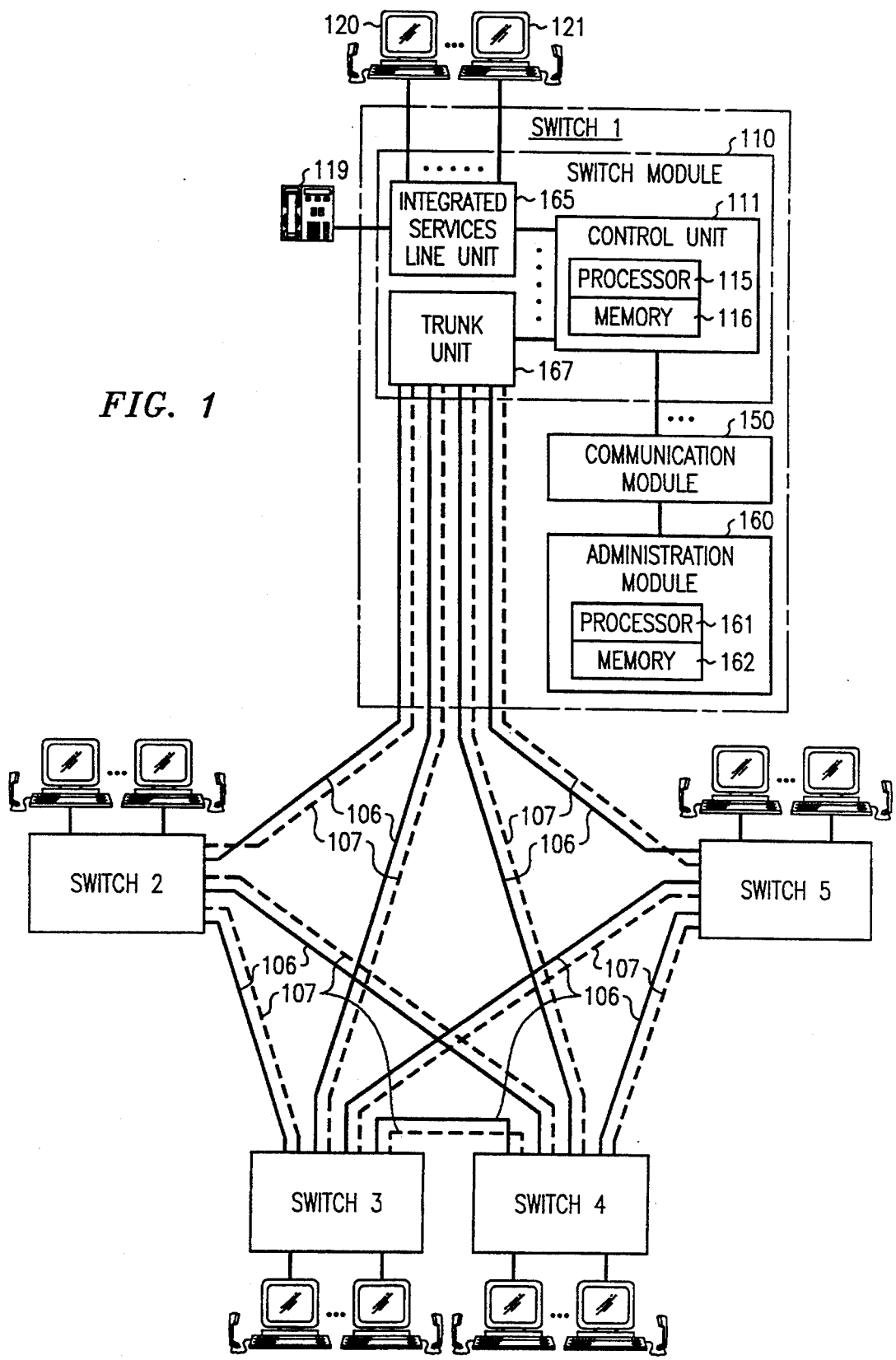
FIG. 1 is a block diagram of a local telephone switching network showing a distributed network ACD according to an exemplary embodiment of this invention.

This invention will be described in connection with a local telephone switching network as illustrated in FIG. 1, but the application of this system is much broader. For example, an ACD according to this invention may be implemented in a network of PBXs or other switching systems without departing from the scope of the appended claims.

An exemplary embodiment of a dynamic network automatic call distribution system (ACD) is described herein in the context of a local telephone switching network configuration of FIG. 1, having five central office switches, 1–5. These switches are interconnected via voice trunks, for example, 106, and data links, for example, 107. Voice trunks 106 interconnect the switches for the voice path and data link 107 is a signaling system such as a common channel signaling (e.g., CCS7) network. More switches (or fewer switches) may be included in this network. Each switch may have connections to other local networks, tandem switches, long distance switches, etc., which are not shown for clarity in describing; the preferred embodiment of this invention.

Illustratively, switch 1 is a distributed control, ISDN electronic telephone switching system such as the system disclosed in U.S. Pat. No. 4,592,048, issued to M. W. Beckner, et al., on May 27, 1986. Alternatively, switch 1 may be a distributed control, analog or digital switch, such as a 5ESS® switch manufactured by AT&T and described in the AT&T Technical Journal, v. 64, no. 6, July/August, 1985, pgs. 1303–1564.

An integrated services digital network (ISDN) is a network that provides end-to-end connectivity to support a wide range of services, including voice and non-voice services, to which users have to access by a set of standard multi-purpose customer interfaces. Switch 1 may include a number of switching modules such as, SM 110, each associated with a different set of telephone station sets or trunks. Each switching module includes a control unit 111 for controlling connections to and from ISDN telephone 119 and operator stations, for example, 120, and 121.

Control unit 111 comprises a processor 115 and memory 116. The architecture of switch 1 includes communication module (CM) 150 as a hub, with a plurality of switch modules (e.g., 110) and an administrative module (AM) 160 emanating therefrom. AM 160 also comprises a processor 161 and memory 162. Switching module 110 terminates digital lines at integrated services line unit 165 to and from operator stations 120 and 121. Trunk unit 167 terminates digital trunks, e.g., 106, and signaling lines 107 interconnecting switch 101 with other switches in the network, as stated above.

Switches 2 through 5, are similar to switch 1, with each offering a plurality of operator service positions. For purposes of describing the exemplary embodiment of this invention, each operator position is designated to handle a specific type of call, e.g., directory assistance, traffic assistance, credit card, etc. However, each of the operator positions may handle any of the other call types on an as-needed basis. Furthermore, the services offered may be, services such as three-way calling or other service circuit service.

An exemplary dynamic network ACD may be seen in the context of FIG. 1, wherein the user of telephone 119 dials a number for operator services, for example, 411 for directory assistance. The digits are collected by integrated services line unit 165 which forwards them to control unit 111. Processor 115 in control unit 111 determines that the dialed number is for operator services for directory assistance. Further, for purposes of describing the exemplary embodiment of this invention, assume that all directory assistance operator positions (e.g., 120, 121) connected to switch 1 are busy. Additionally, a check can be made to determine how long the call would wait in a queue for this operator service,. If the waiting time is greater than a threshold value, the service is considered blocked.

When a service is busy or blocked, processor 115 of control unit 111 in switch module 110 consults a dynamic table of availability in memory 116 to determine which of the switches (2-5) have available operator service positions for directory assistance. Processor 115 of control unit 111 in switch module 110 consults the trunk availability table and the operator position availability table for this service and then determines which switch has the most available operator service positions, and can be reached via directly connected trunk, for example, switch number 2. Control unit 111 then causes a connection from integrated services line unit 165 to trunk unit 167, connects a trunk 106 to switch 2, which then establishes an operator connection.

In this example, switch 1 knows the availability status of the operator positions in switches 2 through 5 for each service. The other switches also know the status of the operator availability in the switches to which they are directly connected. That is, in the example of FIG. 1, switches 1, 3, and 4 know the status of switches 1 through 5, while switches 2 and 5 know the status of switches 1, 3, and 4. Alternatively, each switch may keep a status for all switches in the network. In this instance, a switch may use operator services in a switch that it is not directly connected to by connecting through a "via" or intermediate switch.

Each time a switch reaches a threshold of operator availability for a specific type of service, the switch sends a message to the other switches via signaling channels, for example 107, to inform them of the change of availability level or unavailability. For purposes of describing the preferred embodiment of this invention, there are three levels of availability. A switch may be highly available, lightly loaded, or heavily loaded. Thresholds may be set for the number of operator positions that constitute each of these categories so that when a threshold number is reached, a message is sent to the other switch to inform them of the change of status. A throttle mechanism may be used according to the exemplary embodiment of this invention in order to prevent switches from sending repeated messages as operator positions are used or become available around these thresholds. The throttle mechanism may, for example, compare the message traffic it is sending to a threshold, and not send messages when the threshold is exceeded. In this manner, flooding of the message network 107 can be avoided.

Figure 2:
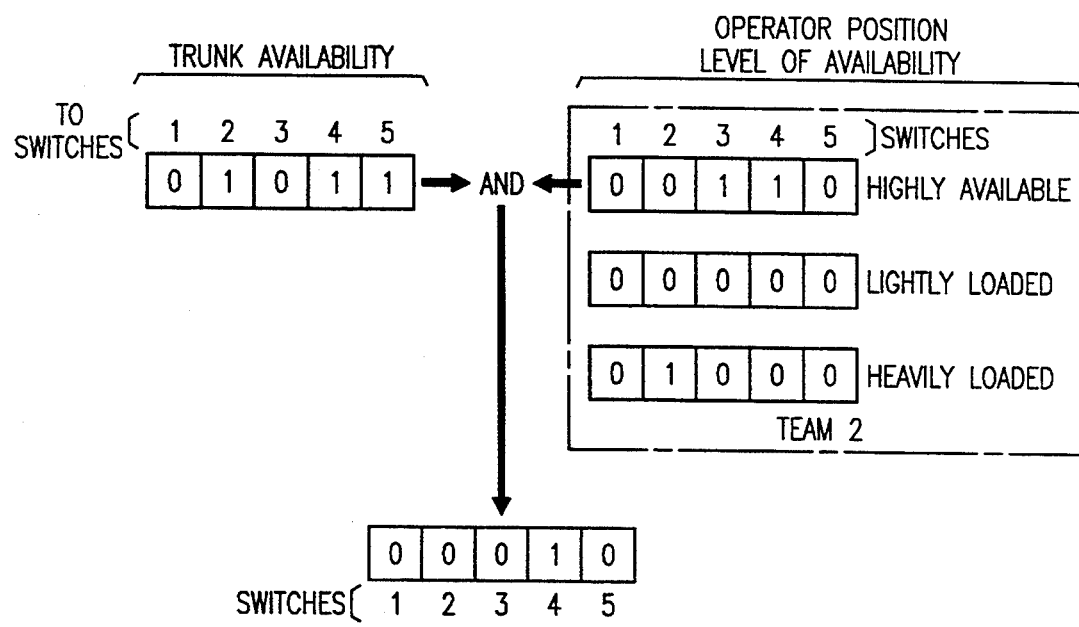
FIG. 2 is a block diagram of an operator position availability status table and trunk availability table of the exemplary embodiment of this invention.

Turning now to FIG. 2, an exemplary operator position level of availability table is shown, along with a trunk availability table. This operator position level of availability table would be stored, for example, in memory 116 of control unit 111 (FIG. 1) of switch 1. This table shows the operator availability for a hypothetical "TEAM 2", which, in the exemplary embodiment of FIG. 1, is directory assistance operators. Each type of service (directory assistance, calling card, etc.) has an individual table in this exemplary embodiment. The first position represents availability of switch 1 (which is always 0, or unavailable to itself), next is the availability of switch 2, next, switch 3, etc., and the last position represents availability of switch 5. According to the table, switches 3, and 4 have operator positions that are highly available, and switch 2 has heavily loaded operator positions. Switch 5 is unavailable.

Trunk availability table, as is stored in memory 116 of control unit 111 for switch 1, shows the availability of trunks connected to other switches in the network of FIG. 1. This shows that there are trunks available to switches 2, 4, and 5 and not available to itself and switch 3. These two tables are "ANDed" together, on a priority basis in the exemplary embodiment of this invention. In this embodiment of FIG. 2, the trunk availability table is "ANDed" with the table of highly available switches. Operator positions are available in switch 4. Therefore, calls for this particular type of operator service can be distributed to switch 4. If no switches were found to be highly available, then the trunk availability table would be "ANDed" with the lightly loaded table. Since no switches have the status of lightly loaded, next the trunk availability table would be "ANDed" with the heavily loaded table. This would result in calls for this type of service being routed to switch 2, because there is an available trunk to that switch and an availability status.

A table, such as the table of FIG. 2, may be kept for each individual type of operator service (such as directory assistance, credit card, etc.). One skilled in the art could develop an overflow scheme which would route, depending on operator availability, overload so that if no operator positions of a particular type are available in the network, that type of operator call would be routed to an alternate operator who could handle the call.

Figure 3:
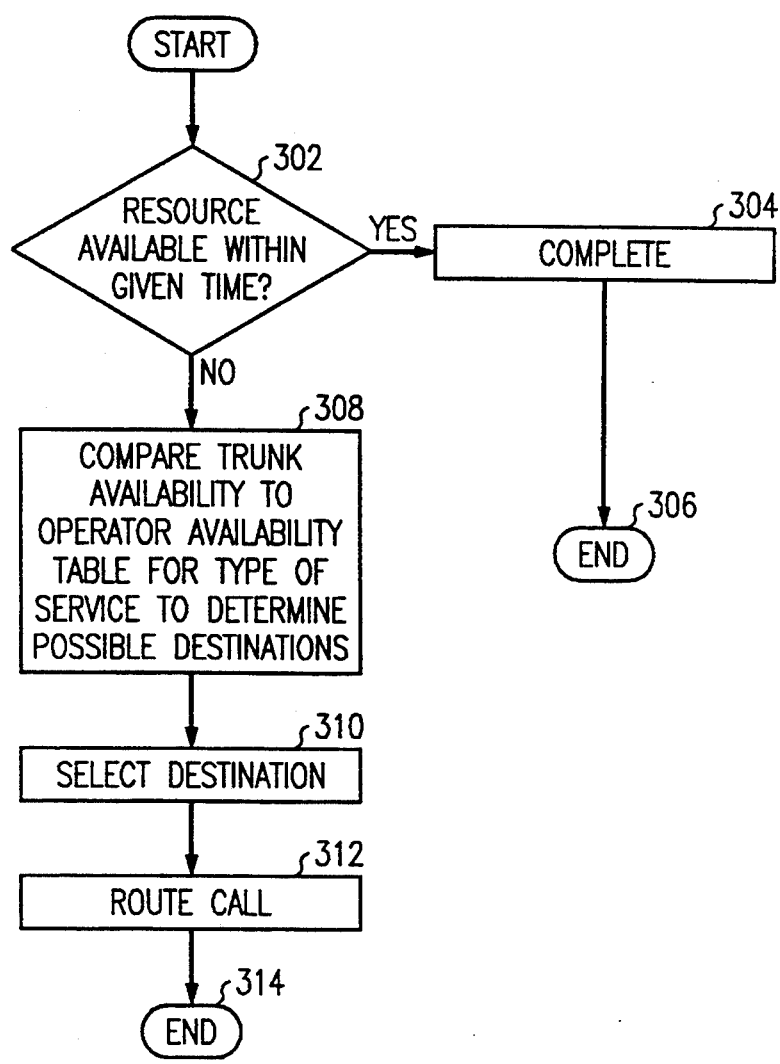
FIG. 3 is a flow chart describing processing of the exemplary embodiment of this invention in the control unit of the switch module of FIG. 1.

Turning now to FIG. 3, a flow chart for processing, as would occur in switch module 110, processor 115 is shown. Processing starts and proceeds to decision diamond 302 where a test is made to determine whether resources are available within a given time on the initial switch. This test is made to determine if the queue for operator positions for this particular service is anticipated to be longer than a predetermined threshold. If resources are or will be available within a reasonable time, then processing continues to box 304 where the call is completed to the next available resource, and processing ends in circle 306.

If no resources will be available within the predetermined time as determined in decision diamond 302, then processing continues to box 308 where the trunk availability table is compared to the operator availability table in availability order (advantageously for the type of requested service) to determine possible destinations, as described above in connection with FIG. 2. Processing proceeds to box 310 where a destination is selected from the one or more destinations as determined in box 308 above. Call processing continues in box 312 where the call is routed to an available operator in the determined destination switch and processing ends in box 314.

Processing, according to the flow chart of FIG. 3 may also occur in processor 161 of administrative module 160. In this scenario, the trunk availability and the operator availability tables are stored in memory 162 and messages sent from control unit 111 to administrative module 160 via communication module 150 to convey routing requests and routing requests and routing information for particular operator service calls.

A further embodiment of this invention may be implemented among nodes in one or more networks in order to minimize blocking and enhance routing efficiency of inter-network traffic. For example, a call is routed through a national toll switching system (node A) to either of two international gateway switches (nodes B and C). According to this exemplary embodiment of this invention, the national toll switch maintains one or more tables for each of the international gateway switches to which it is connected. The tables include an indication of the status of the outgoing trunks between the gateway switch and gateway switches in other countries. By ANDing the trunk states of the trunks between the national toll switch and the gateway switches with the states of the outgoing trunks of the gateway switches connecting to other international gateway switches, the toll switch can route outgoing calls to the gateway switch that is most likely to be able to complete the call. Advantageously, blocking is minimized and the international facility cost is minimized by routing via the least costly route.

It is to be understood that the above-described embodiment is merely illustrative of the principles of the invention and that many variations may be devised by those skilled in the art without departing from the scope of the invention. It is, therefore, intended that such variations be included within the scope of the claims.

We claim:

1. A method for use in a distributed, network-based automatic call distribution (ACD) system, said ACD system comprising a plurality of network switching systems interconnected by trunks and by a signaling network, each of said plurality of switching systems offering a plurality of services, each of said plurality of switching systems maintaining a table of trunk availability between itself and other switches and each of said plurality of switching systems maintaining a table of service availability containing availability of the services offered at each of said plurality of switching systems, said method comprising the steps of:

when a threshold of availability of said services is reached at each of said plurality of switching systems, each of said plurality of switching systems informing the other of said plurality of switching systems by sending messages over said signaling network about the availability of services;

receiving a call for one of said services at a first of said plurality of switching systems;

in response to said first switching system determining that it cannot provide said service, said first switching system determining which one of said plurality of switching systems is available to provide said service by consulting said first switching system's trunk availability table and service availability table to determine which of the other switching systems has both an available trunk connected to said first switching system and available services; and distributing said call to said determined one of said other switching systems; wherein said informing is controlled by comparing said message traffic to a message traffic threshold and not sending messages when said message traffic threshold is exceeded so that said signaling network is not flooded by messages.

2. A method according to claim 1 wherein said service availability table comprises a plurality of levels of availability, and wherein said step of determining which of said plurality of switching systems; is available to provide said service includes determining which one of said plurality of switching systems has the highest level of availability.

3. A distributed, network-based automatic call distribution (ACD) system said ACD system comprising:

a plurality of switching systems interconnected by trunks and by signaling means for delivering messages among said switching systems, each of said plurality of switching systems offering a plurality of services, each of said plurality of switching systems including trunk availability means for storing an availability status of said trunks and service availability means for storing art availability status of services at each of said plurality of switching systems;

determining means at each of said plurality of switching systems responsive to receipt of a request for a service when said service is not available at that switching system for determining which of said plurality of switching systems is available to provide said service by consulting said trunk availability means and said service availability means to determine which of said switching systems has both an available interconnecting trunk and said service available, said determining means further comprising means for informing the other switching systems via said signaling means when a threshold of availability of said services is reached at said each of said switching systems and means for throttling message traffic by comparing said message traffic to a threshold of message traffic and not sending messages when said message traffic threshold is exceeded so that said signaling network is not flooded by messages; and distribution means at each of said plurality of switching systems for distributing said call to said determined switching system.

* * * * *

UNITED STATES PATENT AND TRADEMARK OFFICE
CERTIFICATE OF CORRECTION

PATENT NO. : 5,450,482
DATED : September 12, 1995
INVENTOR(S) : H.T. Chen, et. al.

It is certified that error appears in the above-indentified patent and that said Letters Patent is hereby corrected as shown below:

Column 6, Claim 3, line 34; "art" should be "an"

Signed and Sealed this

Thirtieth Day of January, 1996

Attest:

BRUCE LEHMAN

*Attesting Officer*   *Commissioner of Patents and Trademarks*